United States Patent
Guan et al.

(10) Patent No.: US 7,590,616 B2
(45) Date of Patent: Sep. 15, 2009

(54) COLLABORATIVE-FILTERING CONTEXTUAL MODEL BASED ON EXPLICIT AND IMPLICIT RATINGS FOR RECOMMENDING ITEMS

(75) Inventors: Wei Guan, Atlanta, GA (US); Christina Yip Chung, Mountain View, CA (US); Long-Ji Lin, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 225 days.

(21) Appl. No.: 11/601,449

(22) Filed: Nov. 17, 2006

(65) Prior Publication Data

US 2008/0120287 A1    May 22, 2008

(51) Int. Cl.
    *G06F 17/30* (2006.01)
(52) U.S. Cl. .................. 707/2; 707/6; 707/7; 707/104.1
(58) Field of Classification Search .................. 707/1–7, 707/104.1; 434/236
    See application file for complete search history.

(56) References Cited

U.S. PATENT DOCUMENTS

| | | | |
|---|---|---|---|
| 6,556,992 B1* | 4/2003 | Barney et al. ................ | 707/6 |
| 2004/0076936 A1* | 4/2004 | Horvitz et al. ............... | 434/236 |
| 2005/0125307 A1* | 6/2005 | Hunt et al. ................... | 705/26 |
| 2007/0143281 A1* | 6/2007 | Smirin et al. ................ | 707/5 |

OTHER PUBLICATIONS

Kamal Ali and Wijnand Van Stam, Tivo: Making Show Recommendations Using a Distributed Collaborative Filtering Architecture, Proceedings of the KDD Conference, ACM, 2004, pp. 187-192.

Greg Linden, Brent Simith, and Jeremy York, Amazon.com Recommendations: Item to Item Collaborative Filtering, Internet Computing, IEEE, 2003, pp. 76-80, vol. 7(1).

Resnick, et al., GroupLens: An Open Architecture for Collaborative Filtering of Netnews, Proceedings of ACM 1994 Conference on Computer Supported Cooperative Work; Chapel Hill, North Carolina, 1994, ACM, pp. 175-186.

Sarwar, et al., Item-Based Collaborative Filtering Recommendation Algorithms, Proceedings of the 10th International Conference on World Wide Web, 2001, pp. 285-295.

* cited by examiner

*Primary Examiner*—Hung Vy
*Assistant Examiner*—Hanh B Thai
(74) *Attorney, Agent, or Firm*—Stattler - Suh PC (57) ABSTRACT

Methods and apparatus for a recommendation system based on collaborative filtering is provided. Explicit and implicit ratings of items by network users are used to create a contextual model. The explicit ratings comprise different rating types regarding different item attributes. The implicit ratings comprise different rating types derived from different user events and may include recency, intensity, or frequency ratings. The contextual model may be optimized for a specific objective function, such as click-through-rate or conversion rate. In other embodiments, item information is used to produce a content model where item information for an item is encoded as metadata into a document that represents the item. The contextual or content model is used to recommend one or more items to a current user. The basic unit of the recommendation system may be an item set of two or more items or a particular sequence of two or more items.

18 Claims, 9 Drawing Sheets

| Rating Type | Explicit/Implicit |
|---|---|
| Battery Life | Explicit |
| Durability | Explicit |
| Ease of Use | Explicit |
| Features | Explicit |
| Overall | Explicit |
| Portability | Explicit |
| Quality | Explicit |
| Style | Explicit |
| Support | Explicit |
| Value | Explicit |
| Click Recency | Implicit |
| Click Intensity | Implicit |
| Click Frequency | Implicit |
| View Recency | Implicit |
| View Intensity | Implicit |
| View Frequency | Implicit |
| Search Recency | Implicit |
| Search Intensity | Implicit |
| Search Frequency | Implicit |
| Buy Recency | Implicit |
| Buy Intensity | Implicit |
| Buy Frequency | Implicit |

COLLABORATIVE-FILTERING CONTEXTUAL MODEL BASED ON EXPLICIT AND IMPLICIT RATINGS FOR RECOMMENDING ITEMS

FIELD OF THE INVENTION

The present invention is directed towards the field of collaborative-filtering based recommendation systems, and more particularly toward a collaborative-filtering contextual model based on explicit and implicit ratings for recommending items.

BACKGROUND OF THE INVENTION

The widespread use of the Internet provides an enormous amount of information to Internet users. This information includes a multitude of items available for online viewing and/or purchase such as products, services, documents, etc. However, the number of available items have become so large in number that a user can only view a small percentage of available items and will not be able to view many items in which the user may have interest.

Currently, collaborative filtering methods have been developed for Internet application to predict (filter) items that a user may have interest. Collaborative filtering has been used to create recommendation systems that predict individual items (e.g., music CDs, DVD movies, news articles, etc.) that a particular user may have interest, using preference information gathered from a group of other users (collaborating) and upon receiving information about the particular user. These predicted items (recommended items) are then presented to the particular user for viewing and/or purchase. As such, a recommendation system using collaborative filtering produces recommended items that are specific to a particular user, but use information gathered from many other users.

Current recommendation systems based on collaborative filtering, however, do not consider all available online information in producing recommended items. As such, there is a need for a more comprehensive recommendation system using collaborative filtering.

SUMMARY OF THE INVENTION

Described herein are methods and apparatus for a network recommendation system based on collaborative filtering. In some embodiments, the recommendation system uses preference information (ratings) regarding a plurality of items collected through a network from a plurality of network users. The preference information is used to recommend one or more items to a current network user. An item represents such things as a product, webpage, news article, music, etc. In these embodiments, the collected preference information is used to create a contextual model comprising a matrix of similarity measurements, each similarity measurement reflecting a level of similarity between two items. The contextual model is used by the recommendation system to recommend the one or more items to the current user.

In some embodiments, the preference information collected from the plurality of network-users used to create the contextual model comprises a plurality of different explicit and implicit rating types. Explicit rating types comprise explicit ratings from network users of different attributes of a particular item (such as explicit ratings for price, ease of use, quality, etc.). Implicit rating types comprise implicit ratings derived from different user behaviors/events (such as clicks, views, purchases, etc.) performed by network users. In further embodiments, different dimensions (such as recency, intensity, and frequency) of implicit rating types are also used to create the contextual model. In additional embodiments, the contextual model and recommendation system are optimized for a specific objective function, such as click-through-rate or conversion rate.

In other embodiments, the recommendation system uses item information regarding the plurality of items to recommend one or more items to a current network user. In these embodiments, the item information is used to create a content model comprising a matrix of similarity measurements. A repository of item information is used to store a plurality of documents, where each document represents an item so that an item is regarded as a document. Various information regarding an item are encoded as metadata into a document representing the item. In some embodiments, a plurality of different types of item information are encoded as a plurality of different types of metadata into a document representing an item. For example, item information comprising text (e.g., a description of the item), attribute/value pairs, taxonomy information, etc. are encoded as metadata into a document for an item.

When a current user is active on the network, preference information (ratings) of one or more items is received from the current user. The preference information received from the current user may comprise a plurality of different explicit and implicit rating types. The preference information from the current user is used, in combination with the contextual model and/or content model to recommend one or more items which are potentially of interest to the current user. For example, the contextual model and/or content model may be used for recommending one or more music CDs that the current user may have an interest, given some rating from the current user on one or more other music CDs. Information (such as text, an image, a hyperlink, etc.) relating to the one or more recommended items are then presented/served to the current user for viewing.

In some embodiments, the basic unit of the recommendation system is based on an item set (comprising two or more items) or item sequence (comprising a specific sequence/order of two or more items) rather than a single item. In these embodiments, preference information regarding a plurality of item sets or item sequences is collected from network users to create a contextual model comprising a matrix of similarity measurements, each similarity measurement reflecting a level of similarity between two item sets or two item sequences. In other embodiments, the recommendation system uses item information regarding a plurality of item sets or item sequences to create a content model comprising a matrix of similarity measurements, each similarity measurement reflecting a level of similarity between two item sets or two item sequences. When a current user is active on the network, preference information (ratings) of one or more item sets or item sequences is received from the current user. The preference information from the current user is used, in combination with the contextual model and/or content model to recommend one or more item sets or item sequences which are potentially of interest to the current user.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

In the discussion below, Section I provides a general description of a network environment in which some embodiments operate. Section II describes a method for creating a contextual model based on preference information (ratings) of items collected from network users. Section III describes a method for creating a content model based on metadata information of items. Section IV describes a method for implementing the contextual and content models for recommending one or more items to a current network user. Section V describes a recommendation system having an item set or item sequence framework.

The following notations are used in the description below:

| Notation | Meaning |
| --- | --- |
| u, $u_j$ | user in plurality of users (user group) |
| i, $i_k$ | item in plurality of items |
| $u_a$ | current user to whom item recommendations are made |
| $i_l$ | candidate/potential item for recommendation |
| $R_t(u, i)$ | rating value of rating type t on item i by user u |
| $R_d$ | default rating value |
| $sim(i_k, i_l)$ | similarity measurement between items $i_k$ and $i_l$ |
| $\bar{R}_{i_k}$ | average rating value on item $i_k$ |
| $\sigma_{R_{i_k}}$ | standard deviation of rating values on item $i_k$ |
| $f_{ik} = \log n_{ik}/n$ | inverse user frequency |
| $Freq(i_k)$ | item frequency: number of users that have rated item $i_k$ |
| $Freq(i_k, i_l)$ | items co-occurrence frequency: number of users that have rated on both items $i_k$ and $i_l$ |
| $Pu_a, i_l$ | predicated rating value on candidate item $i_l$ by current user $u_a$ |

I. Network Environment

Figure 1:
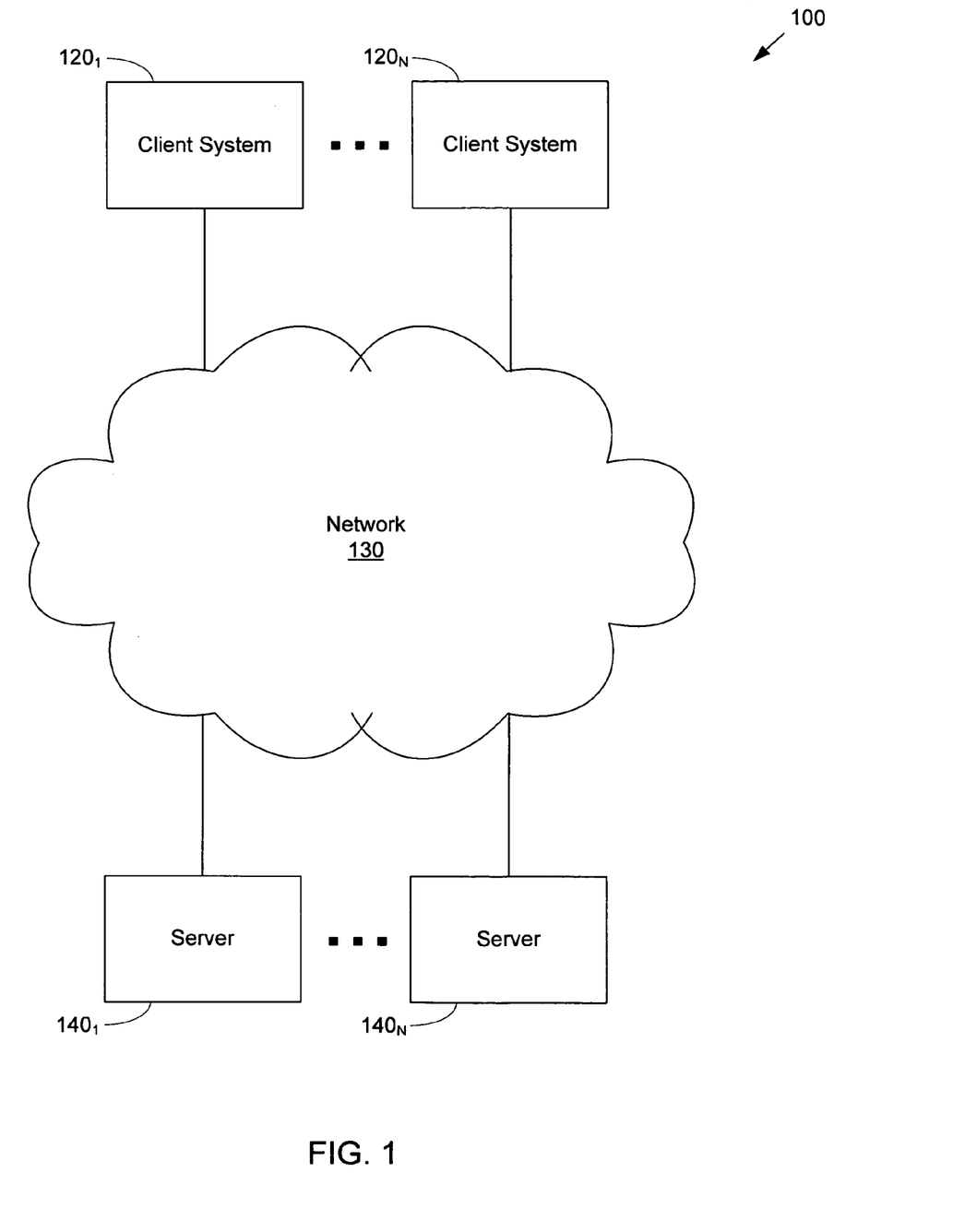
FIG. 1 shows a network environment in which some embodiments operate.

FIG. 1 shows a network environment 100 in which some embodiments operate. The network environment 100 includes a plurality of client systems $120_1$ to $120_N$ coupled to a network 130 (such as the Internet or an intranet, an extranet, a virtual private network, a non-TCP/IP based network, any LAN or WAN, or the like) and server systems $140_1$ to $140_N$. A server system may include a single server computer or number of server computers. The client system 120 is configured to communicate with any of server systems $140_1$ to $140_N$, for example, to request and receive content (e.g., item information on a web page).

The client system 120 may include a desktop personal computer, workstation, laptop, PDA, cell phone, any wireless application protocol (WAP) enabled device, or any other device capable of communicating directly or indirectly to a network. A client system 120 typically includes one or more user interface devices (such as a keyboard, a mouse, or the like) for interacting with a graphical user interface (GUI) of a web browser on a display (e.g., monitor screen, LCD display, etc.). As used herein, the terms user and client system may be used interchangeably. As used herein, a client system 120/user is considered "active on a network" when it is interacting with a server on a network (such as servers $140_1$ to $140_N$ on the network 130).

The client system 120 typically runs a web browsing program allowing a user of the client system 120 to interact with server systems $140_1$ to $140_N$ over network 130 to perform various user events in relation to an item, a user event comprising any of a plurality of different user interactions with a server. Such user events include submitting a search relating to an item (searching for an item), selecting/clicking on a hyperlink relating to an item (clicking on an item), receiving/viewing information relating to an item (viewing on an item), and submitting a purchase order for an item (purchasing an item) through interaction with one or more server systems $140_1$ to $140_N$. An item represents such things as a product, service, news article, webpage, audio, document, etc. Information relating to an item may comprise any variety of forms that can be included on a webpage, including text, images, video, audio, hyperlinks, etc. The webpage may be formatted according to the Hypertext Markup Language (HTML), the Extensible Markup Language (XML), Standard Generalized Markup Language (SGML), or any other language.

In some embodiments, the client systems $120_1$ to $120_N$ and/or system servers $140_1$ to $140_N$ are configured to perform the methods described herein. The methods of some embodiments may be implemented in software or hardware.

II. Producing a Contextual Model

Figure 2:
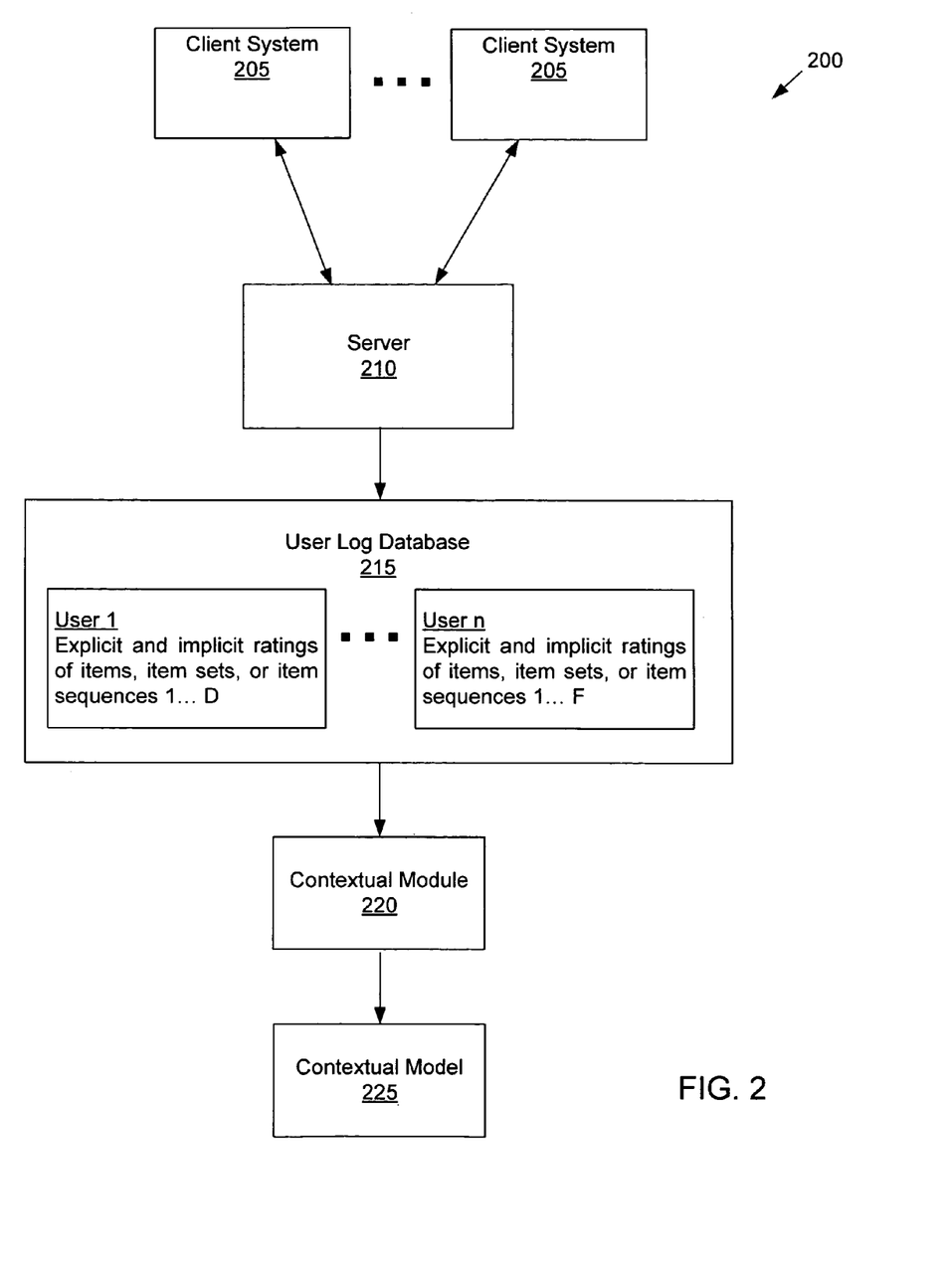
FIG. 2 shows a conceptual diagram of a system for producing a contextual model for a collaborative-filtering based recommendation system.

FIG. 2 shows a conceptual diagram of a system 200 for producing a contextual model for a collaborative-filtering based recommendation system. The system 200 includes a plurality of client systems 205, a server 210, a user log database 215, a contextual module 220, and a contextual model 225. Various portions of the system 200 may reside in one or more servers (such as servers $140_1$ to $140_N$).

The client system 205 is configured (e.g., via a web browsing program) to interact with a user to receive explicit and implicit ratings of items from the user. Explicit ratings comprise rating values given directly by a user for particular attributes (e.g., durability, quality, appearance, etc.) of an item. Implicit ratings comprise rating values that are derived from a user event performed by the user (such as a click, view, purchase, search, etc.) in relation to an item.

The client system 205 is further configured to interact with the server 210 over a network to transmit explicit user ratings and perform various user events in relation to items. For example, the client system 205 may interact with webpages stored on the server 210 to provide explicit ratings for various attributes of various items. Also, the client system 205 may interact with webpages stored on the server 210 to perform various user events in relation to various items. Examples of user events include submitting/performing a search relating to an item (searching for an item), selecting/clicking on a hyperlink relating to an item (clicking on an item), receiving/viewing information relating to an item (viewing on an item), submitting a purchase order for an item (purchasing an item), printing an item, listening to an item, downloading an item, etc. through interaction with the server 210.

The server 210 receives a plurality of explicit ratings and user events regarding a plurality of items from a plurality of network users/client systems 205. The server 210 logs and stores the received explicit ratings and user events into the user log database 215 for a predetermined time period (e.g., one week). For each user, the user log database 215 stores explicit ratings and implicit ratings (derived from user events) received from the user regarding one or more items (e.g., items 1 to D). As shown in FIG. 2, the user log database 215 stores explicit and implicit ratings received from users 1 to n, where users 1 to n comprises a user group from which the contextual model is based. In some embodiments, the user log database 215 also stores the date and time when an explicit rating or user event was received by the server 210.

Figure 3:
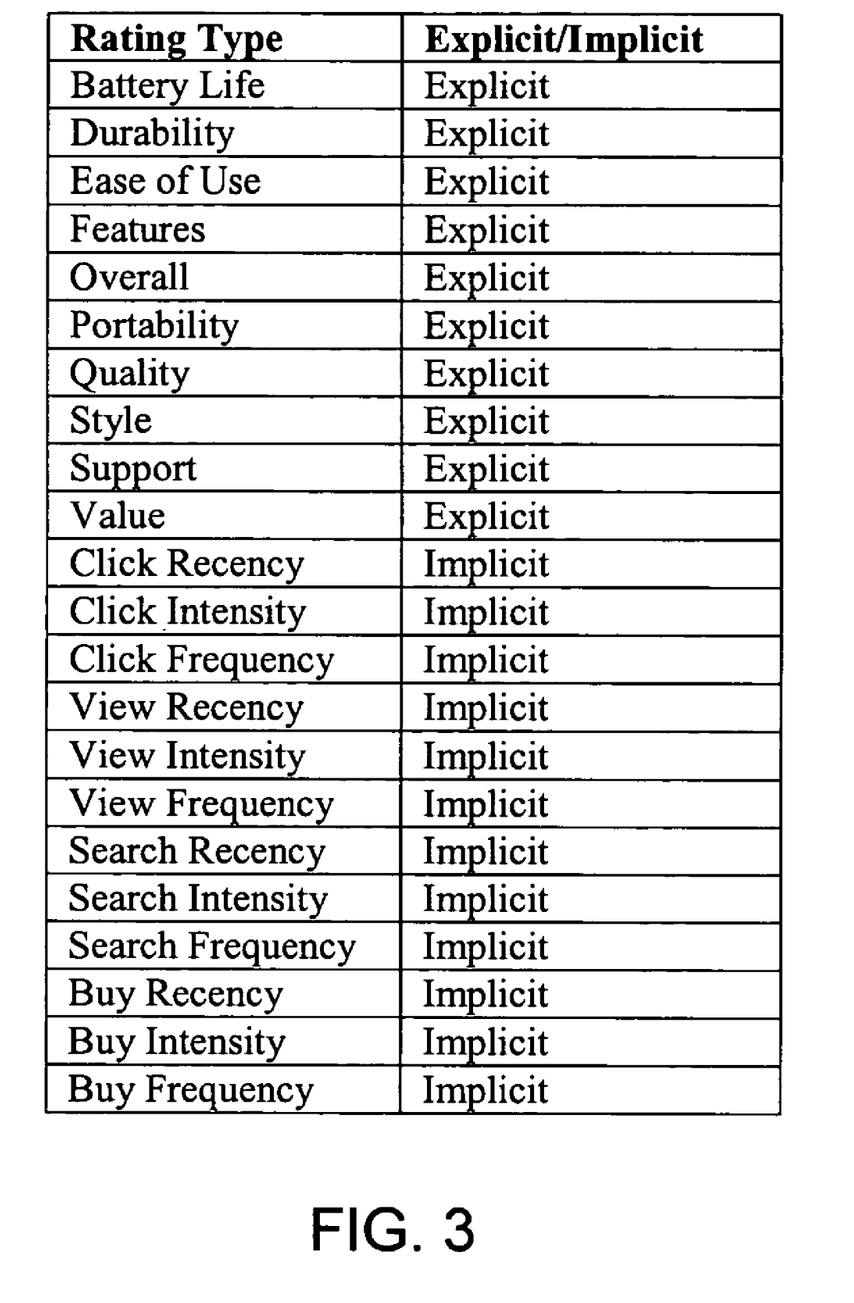
FIG. 3 shows examples of different explicit and implicit rating types.

The contextual module 220 receives the logged and stored plurality of explicit ratings and user events regarding a plurality of items (referred to as item preference information) to produce the contextual model 225. The contextual module 220 derives implicit ratings regarding the plurality of items using the received user events. As discussed above, different implicit rating types comprise ratings derived from different user events. Particular user events in relation to an item are considered to be indicative of a user's preference towards the item (where such user events imply the user is partial to an item). For example, clicks or views on an item by a user imply a preference for the item by the user, where a click rating for an item can be derived from a user clicking on the item and a view rating for an item can be derived from a user viewing the item. In some embodiments, a plurality of different explicit and implicit rating types are used to create the contextual model 225. FIG. 3 shows examples of different explicit and implicit rating types that may be used to create the contextual model 225.

In further embodiments, the recency, intensity, and frequency dimensions of a user event is considered in producing the contextual model 225. In these embodiments, the recency, intensity, and frequency dimensions of implicit rating types are used to create further implicit rating types. For example, as shown in FIG. 3, the recency, intensity, and frequency of clicks on an item are used to produce three implicit ratings types for the item: click recency, click intensity, and click frequency. As such, for a particular item, separate implicit ratings can be determined for click recency, click intensity, and click frequency.

The recency dimension of a user event indicates how recent the user event occurred regarding the item (which can be determined using the date and time logged and stored for the user event). As such, a relatively recent user event regarding an item would have a relatively high recency rating value for the item. For example, a relatively recent click on an item would produce a relatively high click recency rating value for the item. The intensity dimension of a user event indicates the amount or number of times the user event occurred regarding an item. As such, a relatively high amount of user events regarding an item would have a relatively high intensity rating value for the item. For example, a relatively high number of clicks on an item would produce a relatively high click intensity rating value for the item. The frequency dimension of a user event indicates the amount or number of times a user event regarding an item occurred over a predetermined period of time. As such, a relatively high amount of user events regarding an item occurring over the predetermined period of time would have a relatively high frequency rating value for the item. For example, a relatively high number of clicks on an item over one day (the given period of time) would produce a relatively high click frequency rating value for the item.

In some embodiments, if a particular explicit or implicit rating type is not given by a user for a particular item, the particular explicit or implicit rating type is set to a default value. In some embodiments, the explicit and implicit rating values are normalized to a predetermined rating scale (e.g., from 0 to 1). Explicit or implicit rating values can be numeric or binary (e.g., yes or no ratings).

For each user in the plurality of users, an overall rating is then determined for each item rated on by the user. A particular user's ratings on an item for the different rating types are used to produce a single overall rating value of the item. In some embodiments, the plurality of different explicit and implicit rating types are summed through an overall rating equation to produce a single overall rating of a particular item by a particular user. In some embodiments, the overall rating equation is expressed as:

$$R(u,i)=R_d+\ldots+R_t(u,i)+\ldots$$

where:
$R(u,i)$=overall rating value of user u on item i;
$R_d$=default value when no rating value is given for a particular rating type; and
$R_t(u,i)$=rating of user u on item i for rating type t (which includes explicit and implicit rating types).

In other embodiments, the overall rating of an item by a particular user comprises a weighted sum of the plurality of different rating types. In some embodiments, the overall rating of an item by a particular user comprises a weighted sum of the plurality of different explicit and implicit rating types. In these embodiments, the overall rating equation is expressed as:

$$R(u,i)=R_d+\ldots+w_tR_t(u,i)+\ldots$$

where:
$w_t$=predetermined weight for rating type t.

In some embodiments, the weight values $w_t$ for the different rating types t are determined to optimize a particular objective function. For example, rating types that are more predictive of the particular objective function can be assigned higher weight values than rating types that are less predictive of the particular objective function. Examples of objective functions are maximizing click-through-rate (CTR) or conversion rate.

As known in the art, click-through-rate of an item reflects the ratio of the number of times an item is selected/clicked on by users, divided by the number of times the item is viewed by the users. For example, a 0.5% CTR means that 5 in 1000 users that viewed the item selected/clicked on the item. As known in the art, the conversion rate of an item relates to the rate at which a particular online action regarding an item is elicited/received from network users given the number of times the item is viewed by the network users. Examples of a particular user action that is elicited/received from users regarding an item include purchasing the item, subscribing to the item, filling out a survey regarding the item, downloading the item, etc. For example, the purchase conversion rate of an item reflects the ratio of the number of times an item is purchased by users, divided by the number of times the item is viewed by the users. In these embodiments, for the overall rating equation, the weight values $w_t$ for the different rating types t are determined to maximize click-through-rate or conversion rate of any recommended items.

Various methods known in the art (such as regression analysis modeling) may be used to determine the appropriate weight values $w_t$ of the rating types t that optimize the particular objective function. For example, explicit or implicit rating types of an item that are more predictive of a user's CTR for the item may be assigned a higher weight value using regression techniques than rating types that are less predictive of the user's CTR for the item. As such, the weight values for the overall rating equation are determined so that the contextual model and recommendation system (which are produced using the overall rating equation) are optimized for a specific objective function (such as maximizing click-through-rate or conversion rate of any items recommended by the contextual model and recommendation system).

For each user in the plurality of users, an overall rating is determined for each item rated by user to produce a user-item matrix $(R(u,i))_{n*m}$ comprising a matrix of overall ratings of the plurality of items by the plurality of users. A plurality of similarity measurements can then be derived for the plurality of items using the overall ratings from the user-item matrix, each similarity measurement reflecting a level of similarity between two items in the plurality of items. The contextual model 225 comprises the plurality of similarity measurements.

In some embodiments, a similarity measurement (denoted as $sim(i_k,i_l)$) between two items $i_k$ and $i_l$ is determined using Equation (1):

$$sim(i_k, i_l) = P(i_l \mid i_k) = \frac{\sum_{\forall u_j, R_{u_j,i_l} > 0 R_{u_j,i_k} > 0} R_{u_j,i_l}}{freq(i_k) \cdot (freq(i_l))^\alpha} \qquad (1)$$

where:

the numerator of Equation (1) comprises the sum of overall ratings of users that rated on both items $i_k$ and $i_l$;

$\alpha$=constant value determined through experimentation and evaluation for best results so that:

$\alpha$=0: conditional probability (affinity, confidence); and $\alpha$=1: lift.

Note that use of Equation (1) considers reliability of users with different item frequency, integrates affinity and lift measures, and can adjust the degree of penalty on frequent items.

In other embodiments, a similarity measurement (denoted as sim $(i_k,i_l)$) between two items (denoted as $i_k$, $i_l$) can be derived using methods known in the art. For example, Pearson's correlation provides a symmetric similarity measurement (Equation (2)). User frequency can be also be considered by multiplying rating values with inverse user frequency ($f_j$=log $n_j/n$) (Equation (3)), since it is assumed that similarity from users rating on a few items is more reliable than similarity from users rating on many items.

$$sim(i_k, i_l) = \frac{\sum_{j=1}^{n}(R_{u_j,i_k} - \bar{R}_{i_k})(R_{u_j,i_k} - \bar{R}_{i_l})}{\sqrt{\sum_{j=1}^{n}(R_{u_j,i_k} - \bar{R}_{i_k})^2}\sqrt{\sum_{j=1}^{n}(R_{u_j,i_l} - \bar{R}_{i_l})^2}} \qquad (2)$$

$$= \frac{1}{n}\frac{\sum_{j=1}^{n}(R_{u_j,i_k} - \bar{R}_{i_k})(R_{u_j,i_k} - \bar{R}_{i_l})}{\sigma_{R_{i_k}} \cdot \sigma_{R_{i_l}}}$$

-continued $$sim(i_k, i_l) = \frac{\sum_j (f_j R_{u_j,i_k} - \bar{R}_{i_k})(f_j R_{u_j,i_l} - \bar{R}_{i_l})}{\sqrt{\sum_j (f_j R_{u_j,i_k} - \bar{R}_{i_k})^2 \cdot \sum_j (f_j R_{u_j,i_l} - \bar{R}_{i_l})^2}} \qquad (3)$$

$$= \frac{\sum_j f_j \left(\sum_j f_j R_{u_j,i_k} R_{u_j,i_l}\right) - \left(\sum_j f_j R_{u_j,i_k}\right)\left(\sum_j f_j R_{u_j,i_l}\right)}{\sqrt{U \cdot V}}$$

$$U = \sqrt{\sum_j f_j \left(\sum_j f_j R_{u_j,i_k}^2\right) - \left(\sum_j f_j R_{u_j,i_k}\right)^2}$$

$$V = \sqrt{\sum_j f_j \left(\sum_j f_j R_{u_j,i_l}^2\right) - \left(\sum_j f_j R_{u_j,i_l}\right)^2}$$

Figure 4:
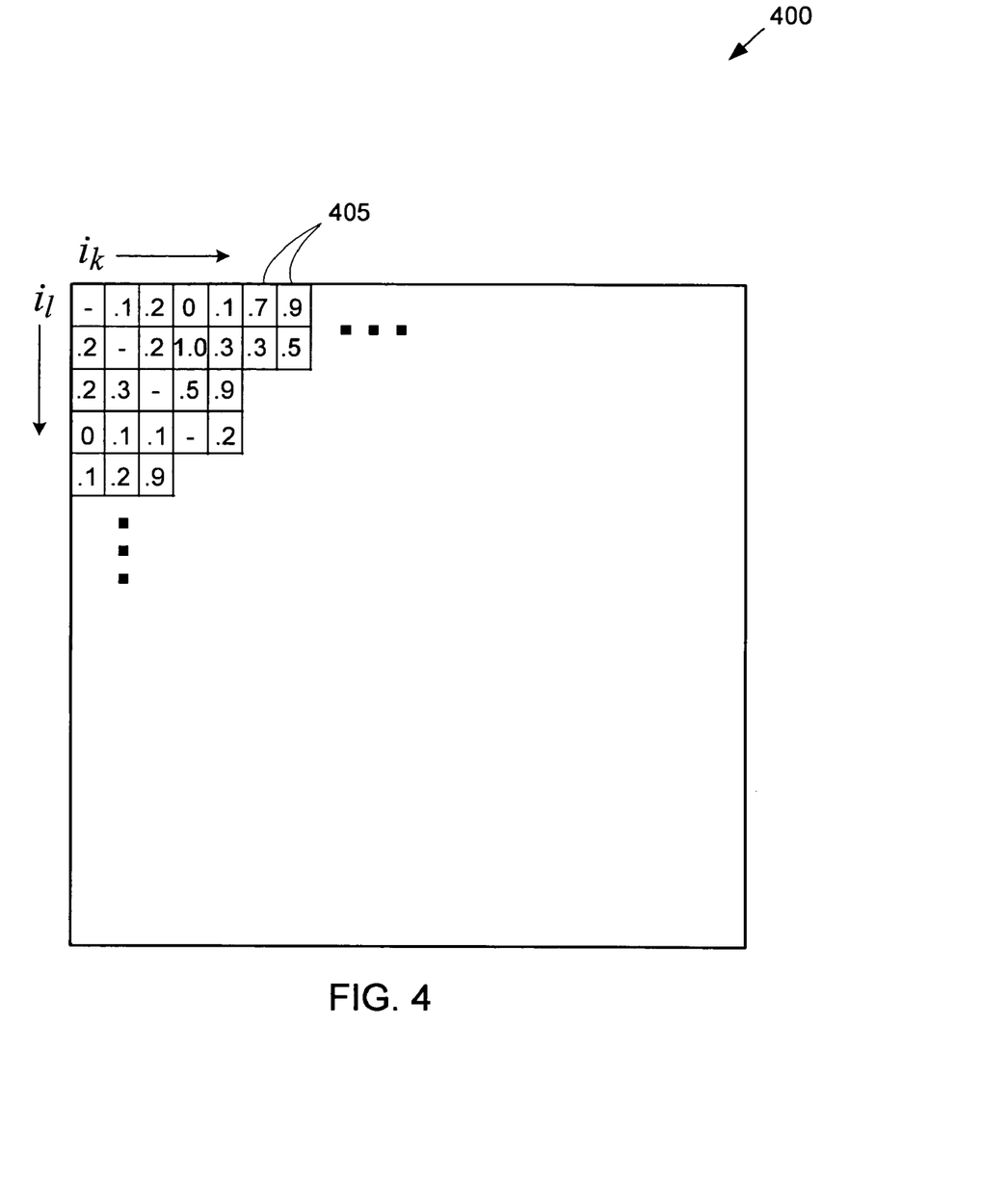
FIG. 4 shows an example of a similarity matrix.

In some embodiments, the contextual model 225 comprises the plurality of similarity measurements in the form of a similarity matrix. FIG. 4 shows an example of a similarity matrix containing example similarity measurements 405 between items ($i_k$, $i_l$). In the example of FIG. 4, the similarity measurements have been normalized to values from 0 through 1.

Figure 5:
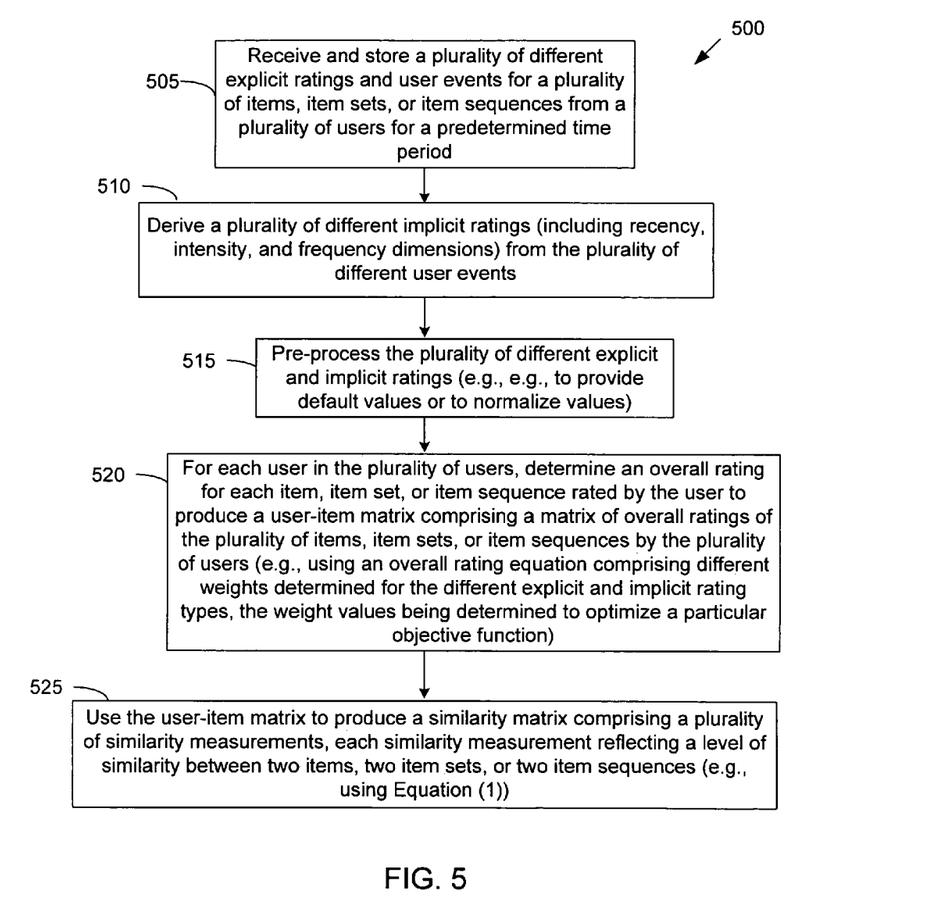
FIG. 5 is a flowchart of a method for producing a contextual model for recommending items.

FIG. 5 is a flowchart of a method 500 for producing a contextual model for recommending items. In some embodiments, the method 500 is implemented by software or hardware. In some embodiments, some steps of the method 500 are performed by a one or more servers and/or one or more client systems. The order and number of steps of the method 500 are for illustrative purposes only and, in other embodiments, a different order and/or number of steps are used.

The method 500 starts by receiving and logging (at 505) a plurality of different explicit ratings and user events regarding a plurality of items from a plurality of network users (user group) for a predetermined time period (e.g., one week). The received explicit ratings and user events are stored to a user log database (along with the data and time each explicit rating and user event is received).

A plurality of different implicit ratings types are then derived (at 510) from the plurality of different user events regarding the plurality of items. In some embodiments, the recency, intensity, and frequency dimensions of user events are used to produce recency, intensity, and frequency implicit rating types for the plurality of items. The plurality of different explicit and implicit ratings are then pre-processed (at 515), e.g., to provide default values for particular explicit or implicit ratings that were not received by a user for a particular item or to normalize the explicit and implicit rating values.

For each user in the plurality of users, an overall rating is then determined (at 520) for each item rated by the user to produce a user-item matrix comprising a matrix of overall ratings of the plurality of items by the plurality of users. In some embodiments, the plurality of different explicit and implicit rating types of an item by a user are summed through an overall rating equation to produce an overall rating of an item. In some embodiments, the overall rating equation comprises different weights determined for the different explicit and implicit rating types. In some embodiments, the weight values for the different rating types are determined to optimize a particular objective function (such as click-through-rate or conversion rate) using any methods known in the art (such as linear regression).

The user-item matrix is then used to produce (at 525) a similarity matrix comprising a plurality of similarity measurements, each similarity measurement reflecting a level of similarity between two items in the plurality of items. In some embodiments, a similarity measurement between two items is produced using Equation (1). In other embodiments, a similarity measurement between two items is produced using any methods known in the art. The contextual model comprises the similarity matrix. The method 500 then ends.

III. Producing a Content Model

Figure 6:
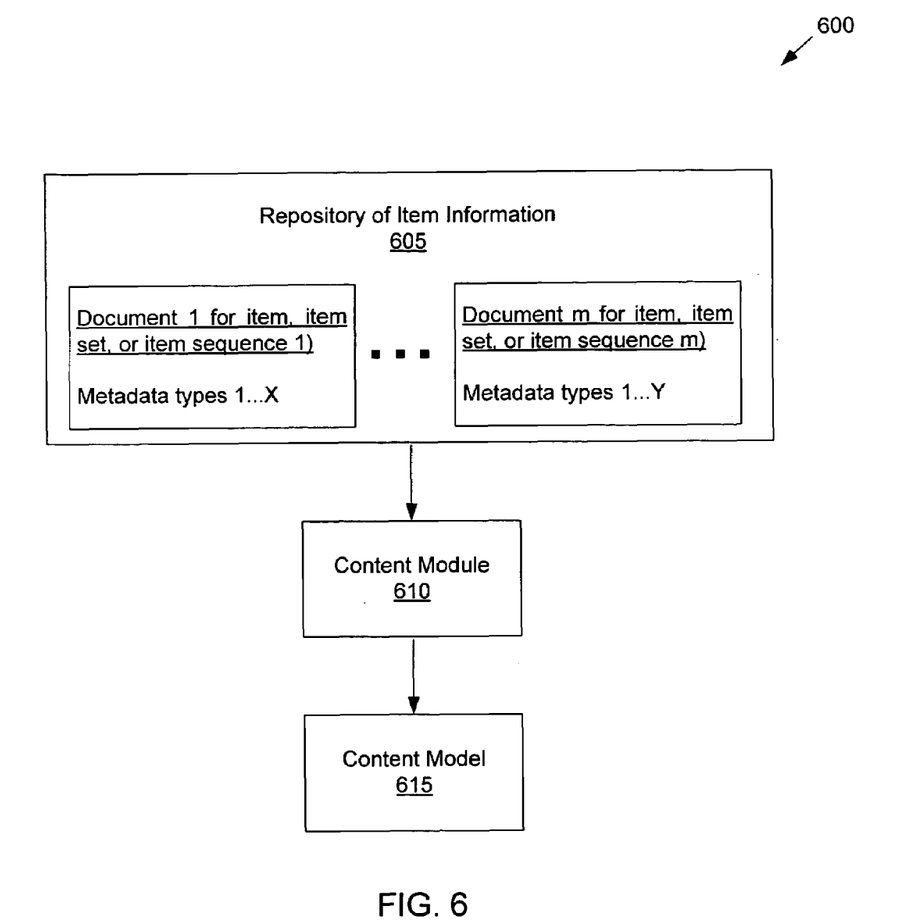
FIG. 6 shows a conceptual diagram of a system for producing a content model for a collaborative-filtering based recommendation system.

FIG. 6 shows a conceptual diagram of a system 600 for producing a content model for a collaborative-filtering based recommendation system. The system 600 includes a repository of item information 605, a content module 610, and a content model 615. Various portions of the system 600 may reside in one or more servers (such as servers $140_1$ to $140_N$).

The repository of item information 605 is used to store a plurality of documents (1 to m) representing a plurality of items (1 to m), each document representing a particular corresponding item (so that an item is regarded as a document). Various information/attributes regarding an item are encoded as metadata into the document representing the item. In some embodiments, a plurality of different types of item information are encoded as a plurality of different types of metadata into the document representing an item. As such, a document representing an item may comprise a plurality of metadata types 1 to X.

Examples of item information and metadata types include text, attribute/value pairs, taxonomy information, search terms, etc. related to an item. Text may comprise a description of the item including keywords associated with the item. Attribute/values pairs comprise an attribute and a value for the attribute, such as Color_Yes, PORTABLE_Yes, Price_110, etc. Taxonomy information comprises category and hierarchical information regarding the item. For example, an item comprising a digital camera may have the following taxonomy information: consumer electronics=>digital camera=>5-6 MB Camera. Search terms comprise search terms associated with the item.

The content module 610 receives the plurality of documents representing the plurality of items to produce the content model 615. The content model 615 comprises a plurality of similarity measurements, each similarity measurement reflecting a level of similarity between two items in the plurality of items. For two items, the content module 610 uses the two documents representing the two items to determine the similarity measurement between the two items. For example, two items belonging to the same taxonomy subcategory or two items sharing many of the same keywords in the item description may be considered relatively similar and thus have a relatively high similarity measurement value.

A similarity measurement (denoted as $sim(i_k, i_l)$) between two items (denoted as $i_k$ and $i_l$) can be derived using information regarding the two items using methods known in the art. For example, item-based correlation similarity methods or item-based cosine similarity methods (expressed in Equation (4)) may be used.

$$sim(i_k, i_l) = \frac{\sum_w tfidf(i_k, w) \, tfidf(i_l, w)}{|tfidf(i_k)| \cdot |tfidf(i_l)|} \quad (4)$$

The content model 615 comprises the plurality of similarity measurements. In some embodiments, the content model 615 comprises the plurality of similarity measurements in the form of a similarity matrix. FIG. 4 shows an example of a similarity matrix containing example similarity measurements 405 between items ($i_k, i_l$).

Figure 7:
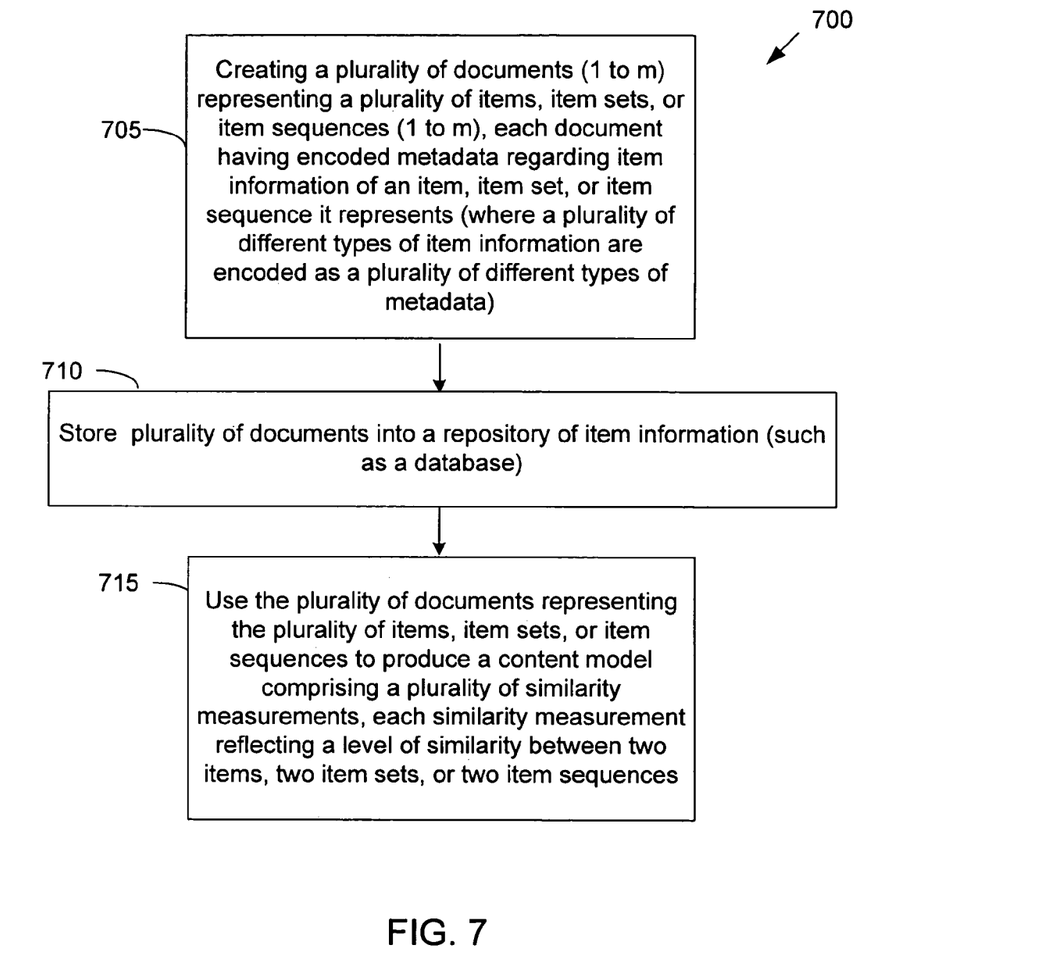
FIG. 7 is a flowchart of a method for producing a content model for recommending items.

FIG. 7 is a flowchart of a method 700 for producing a content model for recommending items. In some embodiments, the method 700 is implemented by software or hardware. In some embodiments, some steps of the method 700 are performed by a one or more servers and/or one or more client systems. The order and number of steps of the method 700 are for illustrative purposes only and, in other embodiments, a different order and/or number of steps are used.

The method 700 starts by creating (at 705) a plurality of documents (1 to m) representing a plurality of items (1 to m), each document having encoded metadata regarding item information of an item it represents. In some embodiments, a plurality of different types of item information are encoded as a plurality of different types of metadata into the document representing an item.

The plurality of documents representing the plurality of items are stored (at 710) into a repository of item information (such as a database). The plurality of documents representing the plurality of items are then used to produce (at 715) a content model comprising a plurality of similarity measurements, each similarity measurement reflecting a level of similarity between two items in the plurality of items. A similarity measurement between two items can be derived using information regarding the two items using methods known in the art. In some embodiments, the content model 615 comprises the plurality of similarity measurements in the form of a similarity matrix. The method 700 then ends.

IV. Recommending Items to a Current User

After creating the contextual and content models (each model comprising an item-item similarity matrix), the models can then be used to recommended items to a current user of the network during a scoring or runtime phase, given some preference information received from the current user.

Figure 8:
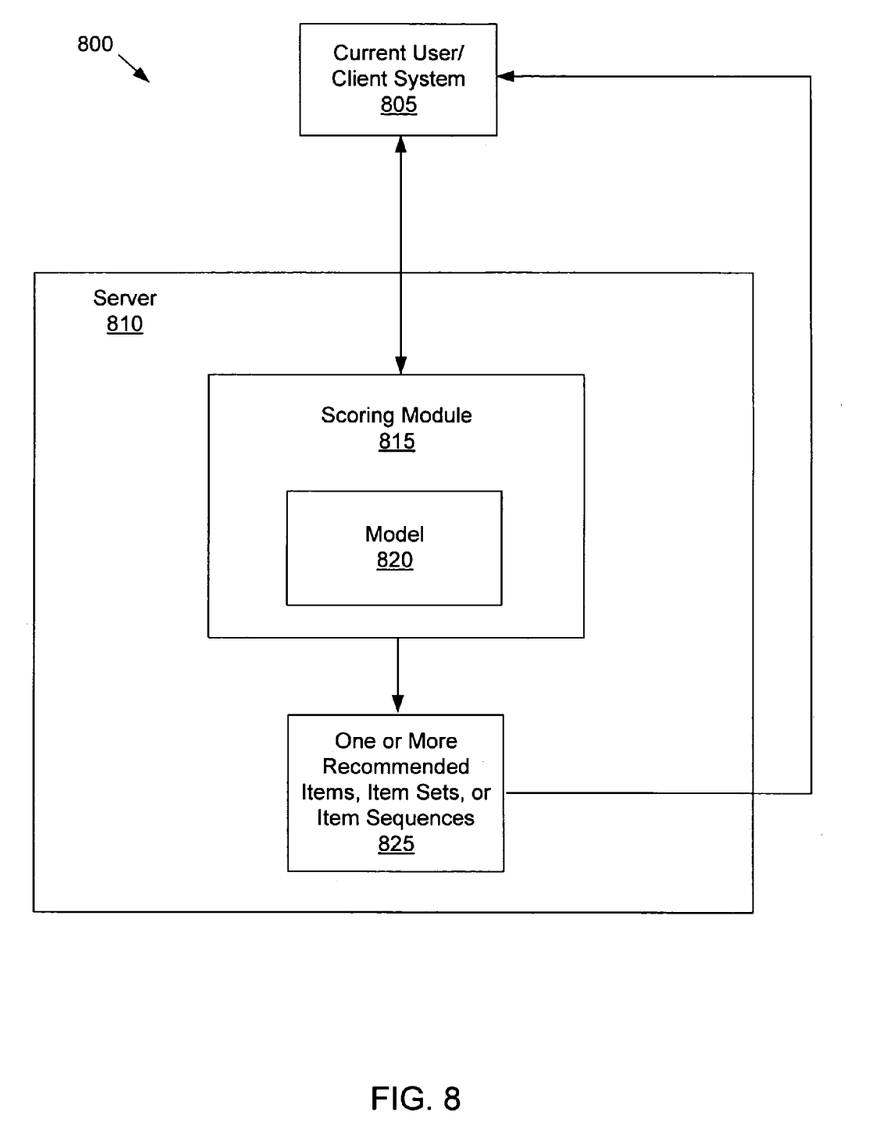
FIG. 8 is a conceptual diagram of a system for implementing the contextual and content models for recommending one or more items to a current network user.

FIG. 8 is a conceptual diagram of a system 800 for implementing the contextual and content models for recommending one or more items to a current network user. When a current user of a client system 805 is active on the network and interacting with a server 810, the server 810 receives explicit ratings or implicit ratings (derived from user events) from the current user regarding one or more items (items 1 to X).

The server 810 implements a scoring module 815 that uses a model 820 (contextual or content model) to recommend one or more items 825 to the current user. The scoring module 815 receives ratings from the current user of items 1 to X (current user preference information) and determines the recommended items 825 using the received current user preference information and the model 820. In some embodiments, to do so, the scoring module 815 produces a predicated overall rating for each item in the plurality of items, the predicated overall rating being the overall rating predicted to be given by the current user for the item, given the received current user preference information.

In some embodiments, a predicted overall rating for an item in the plurality of items is given by Equation (5).

$$P_{u_a, i_l} = \kappa \Sigma_{i_k} sim(i_k, i_l) R_{u_a, i_k} \quad (5)$$

where:

$u_a$ = current user;

$i_l$ = candidate item $i_l$ among the plurality of items;

$P_{u_a, i_l}$ = predicated overall rating value on candidate item $i_l$ by the current user $u_a$;

$i_k$ = an item (among items 1 to X) that the current user rated;

sim($i_k$,$i_l$))=similarity measurement between items $i_k$ and $i_l$ (retrieved from the contextual or content model); and $R_{u_a,i_k}$=rating of item $i_k$ given by the current user $u_a$.

In other embodiments, the scoring module 815 uses other methods known in the art to determine the predicated overall rating for each item in the plurality of items.

After determining the predicated overall rating for each item in the plurality of items, the scoring module 815 selects the items having the top Y predicated ratings (Y being a predetermined number) as the recommended items 825 for the current user. For example, the scoring module 815 may select the items having the top 3 predicated ratings as the recommended items for the current user. Note that the list of recommended items may differ depending on which model is used by the scoring module 815, either the contextual or content models.

Information relating to the one or more recommended items is then presented/served to the current user/client system 805. For example, such information may include text (e.g., the name or title of a recommended item), an image (e.g., an image of a recommended item), a hyperlink (e.g., to a webpage having a detailed description of a recommended item), video, audio, etc.

Figure 9:
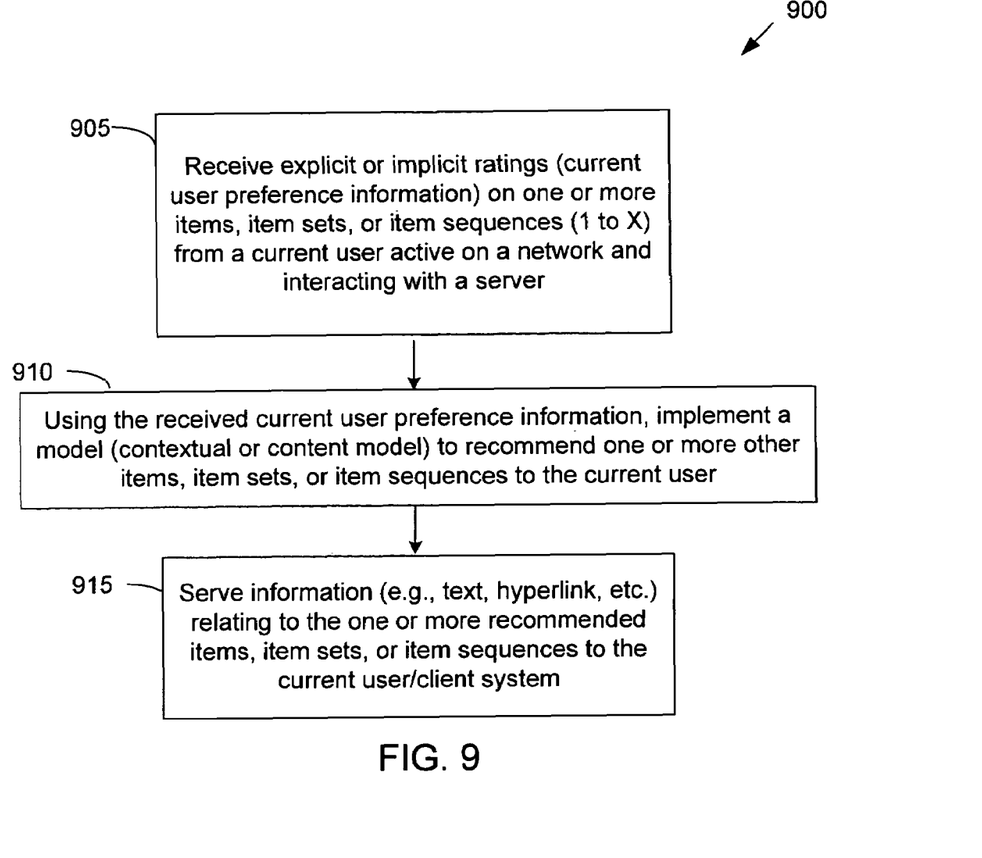
FIG. 9 is a flowchart of a method for implementing the contextual and content models for recommending one or more items to a current network user.

FIG. 9 is a flowchart of a method 900 for implementing the contextual and content models for recommending one or more items in a plurality of items to a current network user. In some embodiments, the method 900 is implemented by software or hardware. In some embodiments, some steps of the method 900 are performed by a one or more servers and/or one or more client systems. The order and number of steps of the method 900 are for illustrative purposes only and, in other embodiments, a different order and/or number of steps are used.

The method 900 starts when explicit or implicit ratings (current user preference information) is received (at 905) for one or more items (1 to X) from a current user (of a client system) that is active on a network and interacting with a server. Using the received current user preference information, the method then implements (at 910) a model (contextual or content model) to recommend one or more other items in the plurality of items to the current user. In some embodiments, the method does so by determining a predicated overall rating for each item in the plurality of items, the predicated overall rating being the overall rating predicted to be given by the current user for the item, given the received current user preference information. The method then selects the items having the top Y predicated ratings as the recommended items for the current user. The method then serves (at 915) information (e.g., text, hyperlink, etc.) relating to the one or more recommended items to the current user/client system. The method 900 then ends.

V. Recommendation System with Item Set or Item Sequence Framework

In some embodiments, the basic unit of the collaborative filtering-based recommendation system described in the above embodiments is based on an item set or item sequence rather than a single item. An item set comprising two or more items (e.g., two or more products, articles, services, etc.). An item sequence comprises a specific sequence/order of two or more items. For example, an item set may comprise items A, B, and C and an item sequence may comprise the specific sequence of items B, A, and C. In these embodiments, the basic unit of the recommendation system is simply changed from a single item to an item set or item sequence.

In these embodiments, explicit and implicit ratings are collected from the plurality of network users regarding a plurality of item sets or item sequences to produce the contextual model. As such, the contextual model comprises a matrix of similarity measurements, each similarity measurement reflecting a level of similarity between two item sets or two item sequences (for example, as shown in FIG. 4).

In further embodiments, a plurality of documents representing a plurality of item sets or item sequences is used to create the content model, each document comprising encoded metadata regarding the item set or item sequence it represents. As such, the content model comprises a matrix of similarity measurements, each similarity measurement reflecting a level of similarity between two item sets or two item sequences (for example, as shown in FIG. 4).

When a current user is active on the network, preference information (ratings) of one or more item sets or item sequences is received from the current user. The preference information from the current user is used, in combination with a contextual or content model (based on an item set or item sequence framework) to recommend one or more item sets or item sequences which are potentially of interest to the current user. Information (e.g., text, hyperlink, etc.) relating to the one or more recommended item sets or item sequences is then served to the current user.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for implementing a collaborative-filtering based recommendation system for recommending one or more items among a plurality of items to a current user of a network, an item representing a product, service, webpage, audio, or document, the method comprising:

producing a model based on explicit ratings of the plurality of items from a plurality of previous network users and implicit ratings of the plurality of items based on user events of the plurality of previous network users, wherein the implicit ratings comprise recency, intensity, and frequency ratings of user events for the plurality of items, a recency rating of a user event for an item indicating how recent the user event occurred for the item, a more recent user event for the item having a higher recency rating value than a less recent user event for the item, an intensity rating of a user event for an item reflecting a number of times the user event occurred regarding the item, and a frequency rating of a user event for an item reflecting a number of times the user event occurred regarding the item over a predetermined period of time, the model comprising a plurality of similarity measurements, each similarity measurement reflecting a level of similarity between two items in the plurality of items;

receiving a first rating of a first item from the current user; and determining the one or more recommended items by producing a predicated rating for each item in the plurality of items, the predicated rating of an item being produced using the received first rating and a similarity measurement, retrieved from the model, that reflects a level of similarity between the item and the first item.

2. The method of claim 1, further comprising:

serving information relating to the one or more recommended items to the current user, wherein information relating to the one or more recommended items comprises text, an image, a hyperlinik, video, or audio.

3. The method of claim 1, wherein:

explicit ratings comprise a plurality of different explicit rating types for a plurality of different item attributes; and implicit ratings comprise a plurality of different implicit rating types based on a plurality of different user events comprising a plurality of different user interactions with a server.

4. The method of claim 3, wherein a user event comprises performing a search relating to an item, selecting a hyperlinik relating to an item, viewing information relating to an item, purchasing an item, printing an item, listening to an item, or downloading an item.

5. The method of claim 1, wherein an item further comprises a set of two or more items or a specific sequence of two or more items.

6. The method of claim 1, wherein the plurality of similarity measurements comprises a plurality of different levels of similarity.

7. The method of claim 1, wherein the predicated rating of an item comprises the rating predicted to be given by the current user for the item.

8. The method of claim 1, wherein determining the one or more recommended items further comprises selecting the items having the top Y predicated ratings, Y comprising a predetermined number.

9. The method of claim 1, wherein the recency rating of a user event for an item is determined using a date and time logged for the user event for the item.

10. A system for implementing a collaborative-filtering based recommendation system for recommending one or more items among a plurality of items to a current user of a network, an item representing a product, service, webpage, audio, or document, the system comprising:

a server computer system comprising:

a scoring module configured for:

producing a model based on explicit ratings of the plurality of items from a plurality of previous network users and implicit ratings of the plurality of items based on user events of the plurality of previous network users, wherein the implicit ratings comprise recency, intensity, and frequency ratings of user events for the plurality of items, a recency rating of a user event for an item indicating how recent the user event occurred for the item, a more recent user event for the item having a higher recency rating value than a less recent user event for the item, an intensity rating of a user event for an item reflecting a number of times the user event occurred regarding the item, and a frequency rating of a user event for an item reflecting a number of times the user event occurred regarding the item over a predetermined period of time, the model comprising a plurality of similarity measurements, each similarity measurement reflecting a level of similarity between two items in the plurality of items;

receiving a first rating of a first item from the current user; and determining the one or more recommended items by producing a predicated rating for each item in the plurality of items, the predicated rating of an item being produced using the received first rating and a similarity measurement, retrieved from the model, that reflects a level of similarity between the item and the first item.

11. The system of claim 10, wherein:

the scoring module is further configured for serving information relating to the one or more recommended items to the current user; and information relating to the one or more recommended items comprises text, an image, a hyperlinik, video, or audio.

12. The system of claim 10, wherein:

explicit ratings comprise a plurality of different explicit rating types for a plurality of different item attributes; and implicit ratings comprise a plurality of different implicit rating types based on a plurality of different user events comprising a plurality of different user interactions with a server.

13. The system of claim 12, wherein a user event comprises performing a search relating to an item, selecting a hyperlinik relating to an item, viewing information relating to an item, purchasing an item, printing an item, listening to an item, or downloading an item.

14. The system of claim 10, wherein an item further comprises a set of two or more items or a specific sequence of two or more items.

15. The system of claim 10, wherein the plurality of similarity measurements comprises a plurality of different levels of similarity.

16. The system of claim 10, wherein the predicated rating of an item comprises the rating predicted to be given by the current user for the item.

17. The system of claim 10, wherein the scoring module is further configured for determining the one or more recommended items by selecting the items having the top Y predicated ratings, Y comprising a predetermined number.

18. The system of claim 10, wherein the recency rating of a user event for an item is determined using a date and time logged for the user event for the item.

* * * * *